(12) United States Patent  (10) Patent No.: US 7,565,848 B2
Fujii  (45) Date of Patent: *Jul. 28, 2009

(54) BICYCLE CONTROL DEVICE

(75) Inventor: Kazuhiro Fujii, Sakai (JP)

(73) Assignee: Shimano Inc., Osaka (JP)

( * ) Notice: Subject to any disclaimer, the term of this patent is extended or adjusted under 35 U.S.C. 154(b) by 616 days.

This patent is subject to a terminal disclaimer.

(21) Appl. No.: 11/331,015

(22) Filed: Jan. 13, 2006

(65) Prior Publication Data
US 2007/0175290 A1 Aug. 2, 2007

(51) Int. Cl.
B60K 17/12 (2006.01)
(52) U.S. Cl. .................................... 74/473.12
(58) Field of Classification Search ............ 74/469, 74/473.12, 473.13, 551.8; 280/260, 261; 200/61.85, 61.91
See application file for complete search history.

(56) References Cited

U.S. PATENT DOCUMENTS

| 4,143,557 | A | | 3/1979 | Wakebe et al. |
| 4,900,291 | A | | 2/1990 | Patterson |
| 5,358,451 | A | | 10/1994 | Lacombe et al. |
| 5,470,277 | A | | 11/1995 | Romano |
| 5,653,649 | A | | 8/1997 | Watarai |
| 5,678,455 | A | | 10/1997 | Watarai |
| 5,768,945 | A | | 6/1998 | Ose |
| 5,950,498 | A | * | 9/1999 | Gossett et al. ............. 74/551.8 |
| 6,038,923 | A | | 3/2000 | Lin |
| 6,073,730 | A | | 6/2000 | Abe |
| 6,178,841 | B1 | * | 1/2001 | Ruckert et al. ......... 74/471 XY |
| 6,227,068 | B1 | | 5/2001 | Masui et al. |
| 6,546,827 | B2 | | 4/2003 | Irie |
| 6,698,307 | B2 | | 3/2004 | Wesling et al. |
| 6,941,834 | B2 | * | 9/2005 | Irie ........................... 74/551.1 |
| 7,350,436 | B2 | * | 4/2008 | Fujii ....................... 74/473.13 |
| 2005/0109577 | A1 | | 5/2005 | Uno et al. |
| 2005/0211014 | A1 | | 9/2005 | Fujii |

FOREIGN PATENT DOCUMENTS

| DE | 295-07-555 U1 | 8/1995 |
| DE | 100 55 922 A1 | 5/2002 |
| EP | 1 535 829 A2 | 11/2004 |
| JP | 08026174 A * | 1/1996 |

* cited by examiner

Primary Examiner—Vicky A Johnson
(74) Attorney, Agent, or Firm—Global IP Counselors, LLP

(57) ABSTRACT

A bicycle control device is provided that has a base member, an electrical shift control switch and a brake lever. The base member has a handlebar mounting portion configured to be fixedly mounted to a free end of a handlebar and an electrical switch housing portion extending longitudinally from the handlebar mounting portion such that a center axis of the free end of the handlebar extends longitudinally through the electrical switch housing portion when the base member is mounted to the free end of the handlebar. The electrical shift control switch is mounted to the electrical switch housing portion of the base member. The brake lever is pivotally attached to the base member to be selectively moved relative to the base member between a rest position and a braking position.

11 Claims, 7 Drawing Sheets

BICYCLE CONTROL DEVICE

BACKGROUND OF THE INVENTION

1. Field of the Invention

This invention generally relates to a bicycle control device. More specifically, the present invention relates to a bicycle control device that includes both an electrical shift control switch and a brake lever, which are configured to be mounted to the free end of a bicycle handlebar in an integrated manner.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for shifting and braking.

In the past, bicycle shifters were mechanically operated devices that were sometimes located near the brake levers of the bicycle. Thus, an operating force was typically applied by one of the rider's fingers to operate a shift control lever, which in turn transmitted the operating force to the drive component of a bicycle shifting mechanism by a cable that was fixed at one end to the control lever. More recently, electric switches have been used instead of mechanical control levers in order to operate the bicycle shifting mechanism. One example of an electrical shift control device is disclosed in U.S. Pat. No. 5,358,451. This patent discloses a plurality of electric switches may be provided at a plurality of handlebar locations in order to allow for quicker shifts and to enhance responsiveness. Another example of an electrical shift control device is disclosed in U.S. Patent Application Publication No. 20005/0211014. While these control devices work well, they are not suited for all types of handlebars. In particular, when these control devices that include both a brake lever and an electrical switch are mounted to a free end of a handlebar, the brake lever and/or the electrical switch can be inconvenient to operate.

In view of the above, it will be apparent to those skilled in the art from this disclosure that there exists a need for an improved bicycle control device. This invention addresses this need in the art as well as other needs, which will become apparent to those skilled in the art from this disclosure.

SUMMARY OF THE INVENTION

One object of the present invention is to provide a bicycle control device having a brake lever and an electrical shift switch that can be mounted to the free end of a handlebar.

One object of the present invention is to provide a bicycle control device having a brake lever and an electrical shift switch that allows the rider to operate both the brake lever and the electrical shift switch without difficulty.

Still another object of the present invention is to provide a bicycle control device having a brake lever and an electrical shift switch that is relatively simple and inexpensive to manufacture and assemble.

Yet still another object of the present invention is to provide a bicycle control device having a brake lever and an electrical shift switch that is relatively easy to attach at the end of the bicycle handlebar.

The foregoing objects can basically be attained by providing a bicycle control device that basically comprises a base member, an electrical shift control switch and a brake lever. The base member includes a handlebar mounting portion configured to be fixedly mounted to a free end of a handlebar and an electrical switch housing portion extending longitudinally from the handlebar mounting portion such that a center axis of the free end of the handlebar extends longitudinally through the electrical switch housing portion when the base member is mounted to the free end of the handlebar. The electrical shift control switch is mounted to the electrical switch housing portion of the base member. The brake lever is pivotally attached to the base member to be selectively moved relative to the base member between a rest position and a braking position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
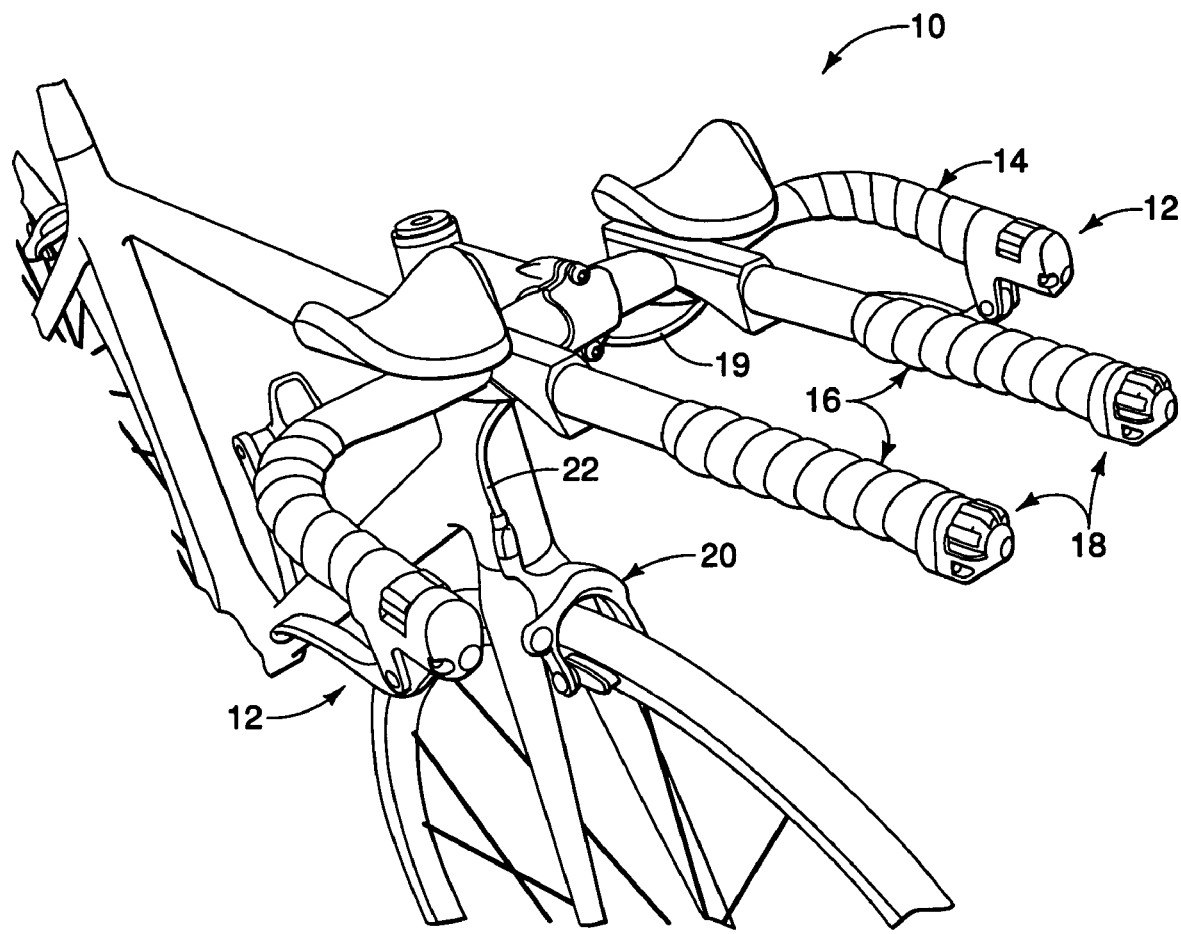
FIG. 1 is a partial front perspective view of a bicycle equipped with a pair of bicycle control (brake/shift) devices coupled to free ends of a bull horn handlebar and a pair of additional attachment bars with electrical shift control devices mounted to their free ends of the attachment bars in accordance with a preferred embodiment of the present invention.
Figure 2:
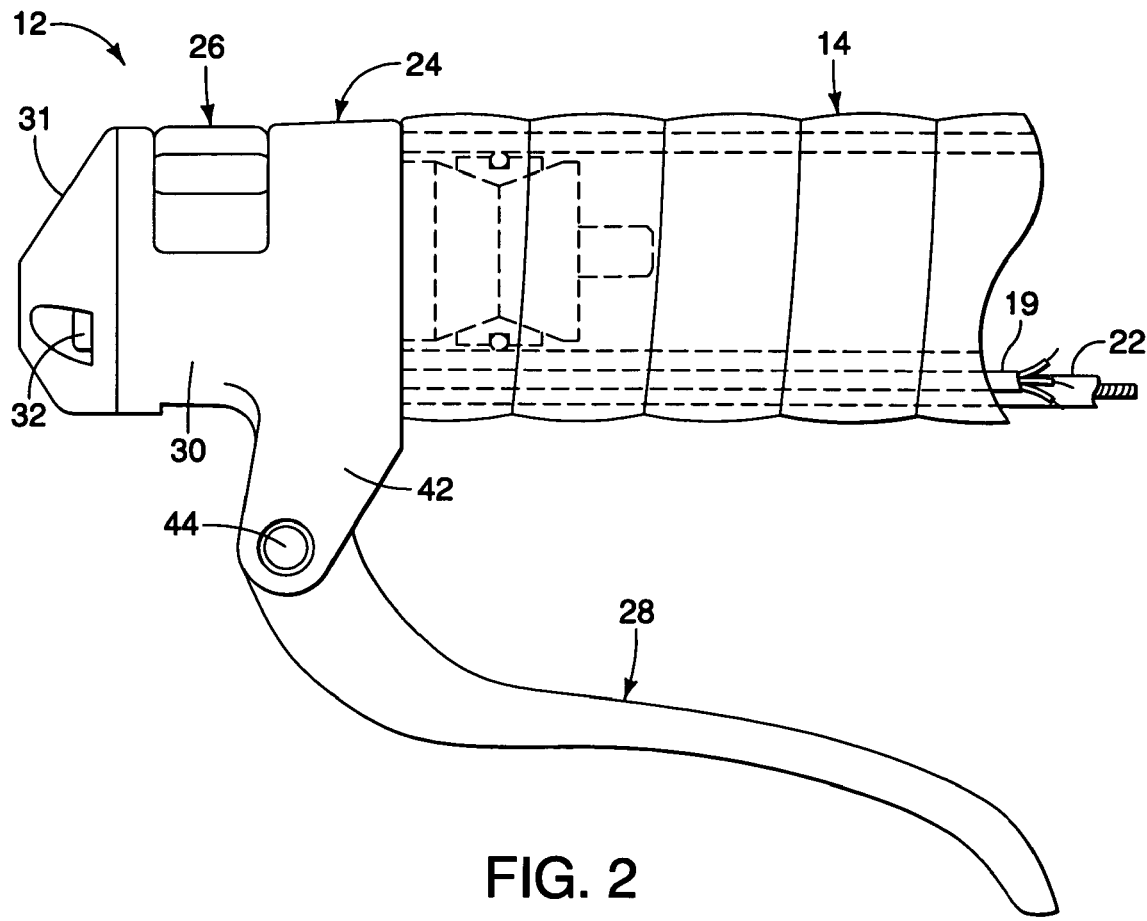
FIG. 2 is an enlarged side elevational view of one of the bicycle control (brake/shift) devices attached to one of the free ends of the bull horn handlebar illustrated in FIG. 1 in accordance with the present invention.
Figure 3:
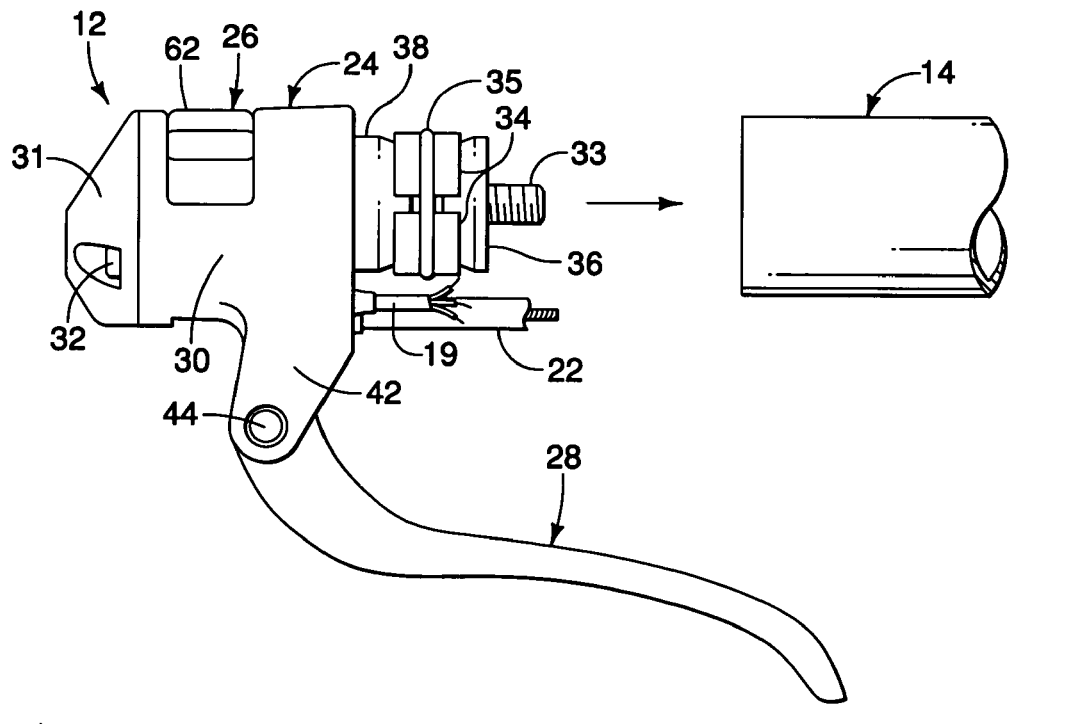
FIG. 3 is an enlarged side elevational view of one of the bicycle control (brake/shift) devices prior to attachment to one of the free ends of the bull horn handlebar illustrated in FIGS. 1 and 2 in accordance with the present invention.
Figure 4:
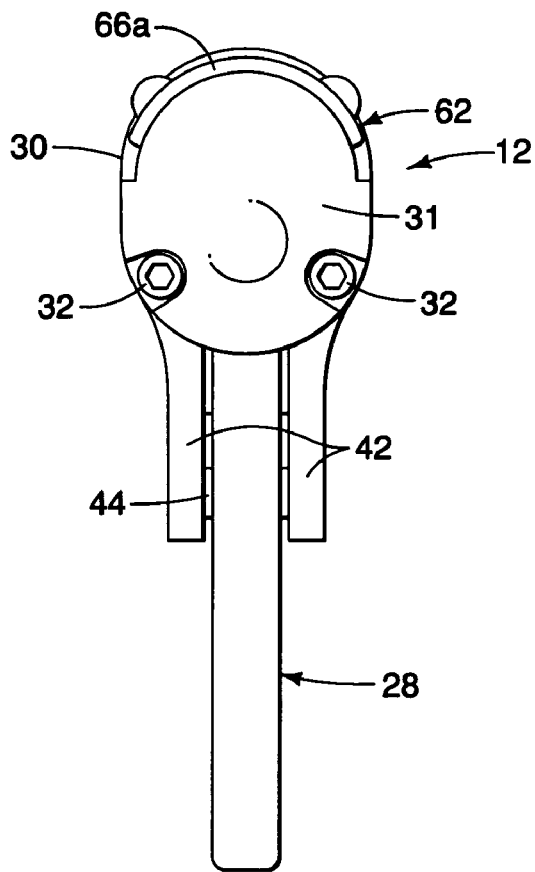
FIG. 4 is a front end elevational view of one of the bicycle control (brake/shift) devices illustrated in FIGS. 1-3 in accordance with the present invention.
Figure 12:
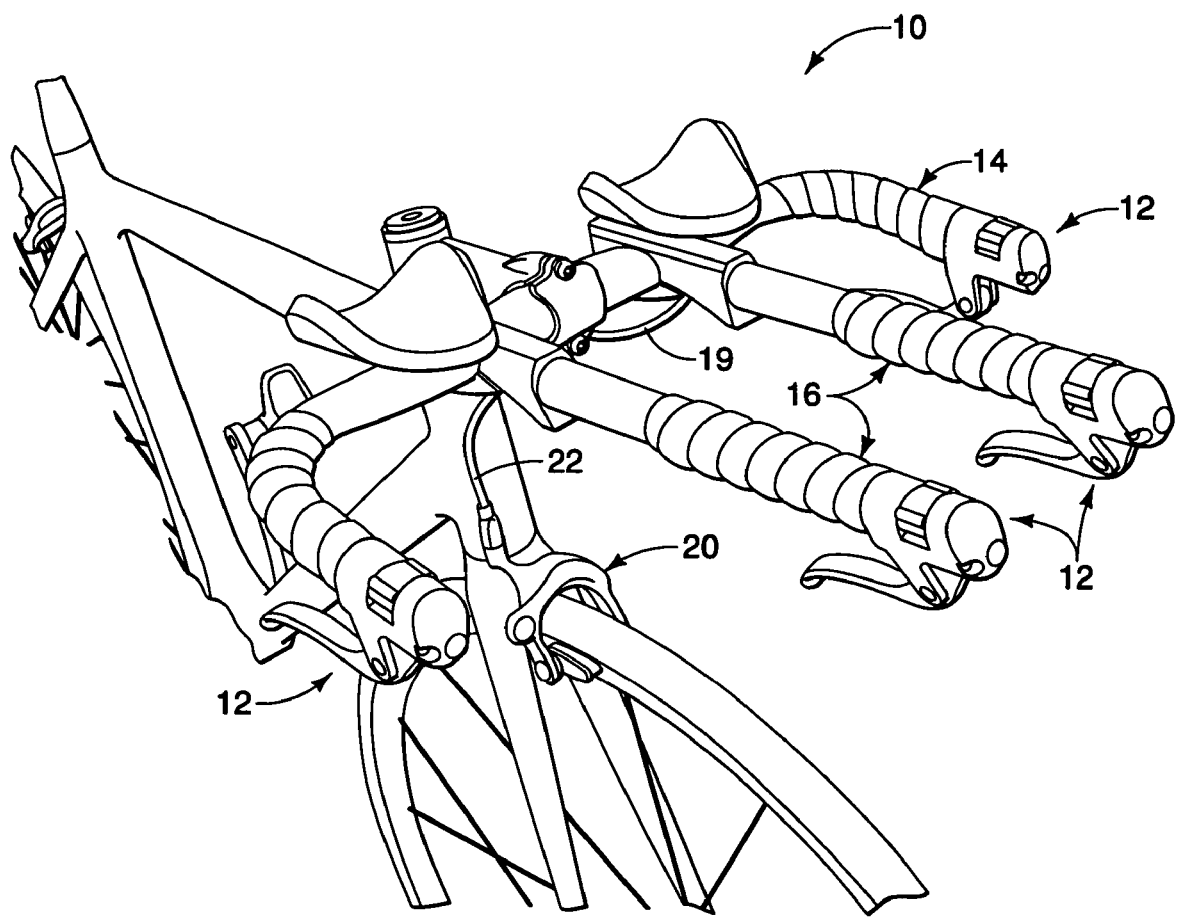
FIG. 12 is a partial front perspective view of the bicycle illustrated in FIG. 1, but equipped with the bicycle control (brake/shift) devices coupled to the additional attachment bars.

Referring initially to FIGS. 1 and 2, a bicycle 10 is illustrated with a pair of electrical shift/brake control devices 12 coupled to free ends of a bull horn handlebar 14 in accordance with the present invention. The bull horn handlebar 14 is also equipped with a pair of additional attachment bars 16 with each of the free ends of the attachment bars 16 having an electrical shift control device 18 mounted thereto. The electrical shift/brake control devices 12 and the additional electrical shift control devices 18 form parts of a brake and shift control system of the bicycle 10 in accordance with the present invention. As best seen in FIG. 12, the electrical shift/brake control devices 12 can be coupled to free ends each of the free ends of the attachment bars 16 in accordance with the present invention.

Since other parts of the bicycle 10 are well known in the art, these other parts of the bicycle 10 will not be discussed or illustrated in detail herein, except for the parts relating to the present invention. Moreover, various conventional bicycle parts, which are not illustrated and/or discussed in detail herein, can also be used in conjunction with the present invention. In other words, it will be apparent to those skilled in the art from this disclosure that various modifications can be made to the various parts of the bicycle 10 without departing from the present invention, as needed and/or desired.

The electrical shift/brake control devices 12 are essentially identical in construction and operation. The electrical shift control devices 18 are also essentially identical in construction and operation to the electrical shift/brake control devices 12, except that the braking aspect of the electrical shift/brake control devices 12 as has been eliminated from the electrical shift control devices 18. One the electrical shift/brake control devices 12 and one of the electrical shift control devices 18 are operatively coupled to a rear derailleur (not shown) via a cycle computer (not shown), the other ones of the electrical shift/brake control devices 12 and the electrical shift control devices 18 are operatively coupled to a front derailleur (not shown) via the cycle computer (not shown). In particular, electrical cords 19 electrically couple the electrical shift/brake control devices 12 and the electrical shift control devices 18 to the cycle computer (not shown). Additionally, one of the electrical shift/brake control devices 12 is preferably mechanically coupled directly to one of the braking devices 20 (only one shown in FIG. 1) via a brake cable 22.

Referring now to FIGS. 2-5, each of the electrical shift/brake control devices 12 mainly includes a base member 24, an electrical shift control switch 26 and a brake lever 28. Basically, the base member 24 is mounted within one of the free ends of the handlebar 14 such that the electrical shift control switch 26 faces upwardly and the brake lever 28 extends downwardly and generally parallel to a main center longitudinal axis $A_1$ of the handlebar 14. The electrical cords 19 and the brake cables 22 extend along outer surfaces of handlebar 14 and/or the attachment bars 16, and are preferably covered by handlebar tape as seen in FIG. 2.

Figure 6:
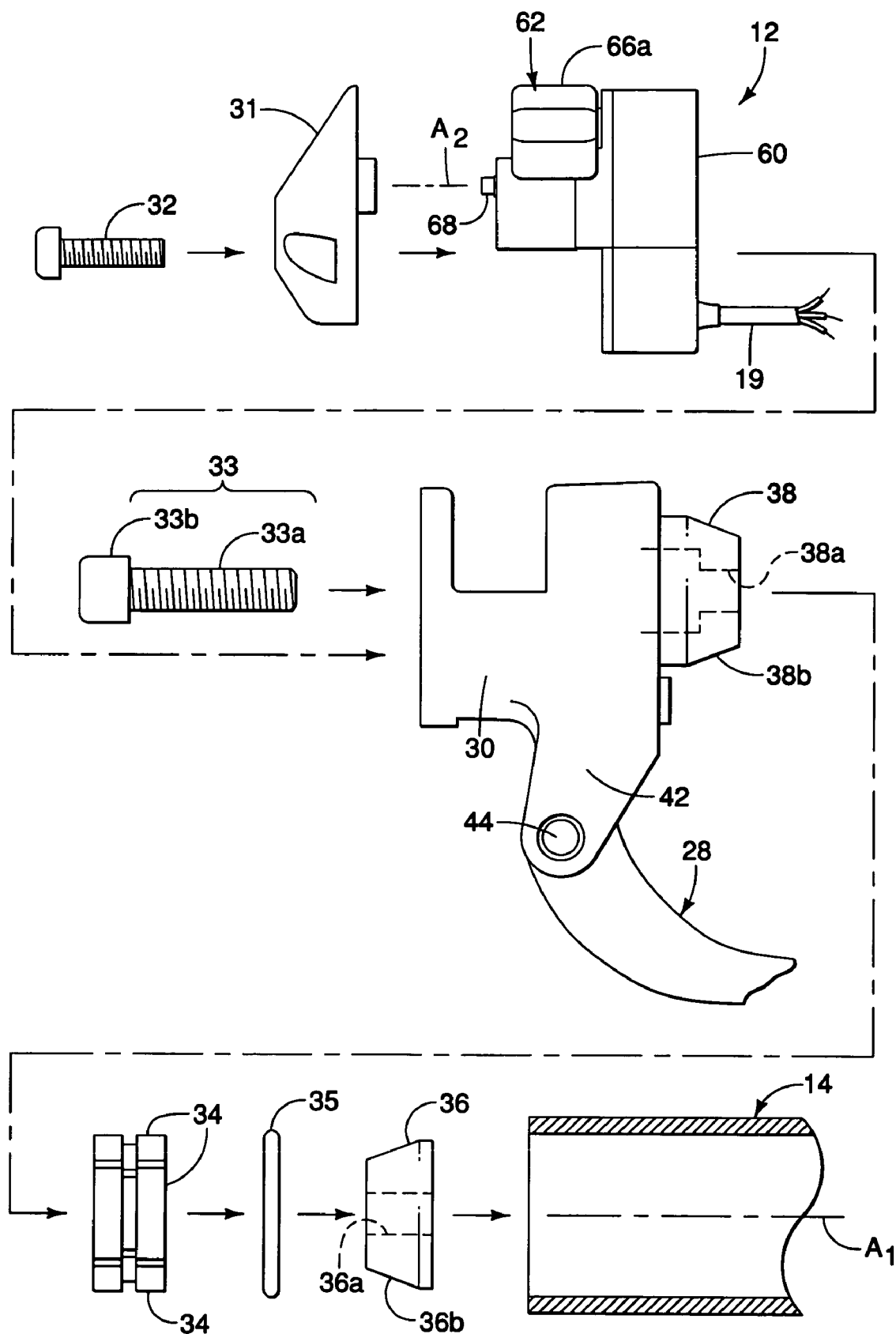
FIG. 6 is an exploded side elevational view of one of the bicycle control (brake/shift) devices illustrated in FIGS. 1-5 in accordance with the present invention.
Figure 7:
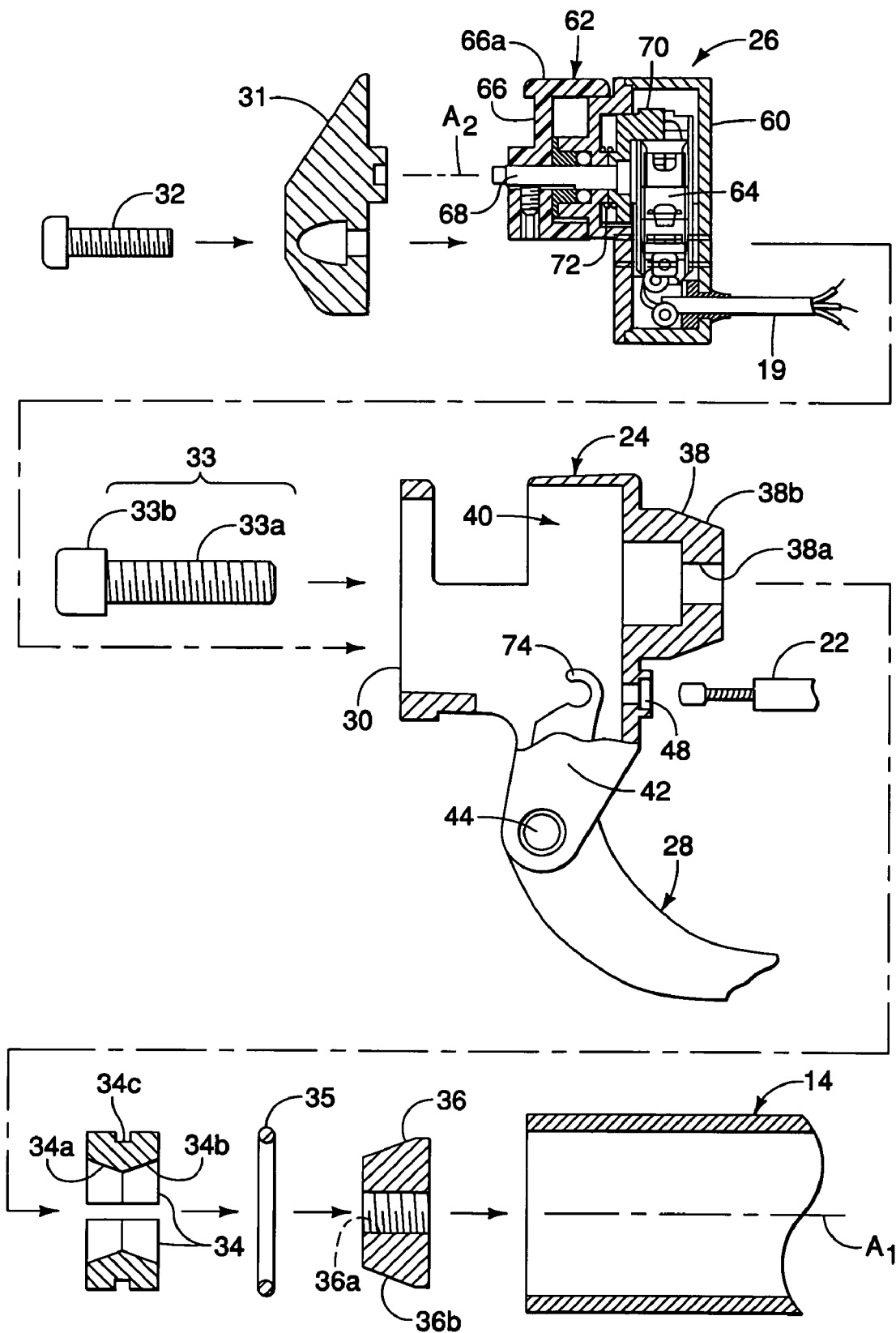
FIG. 7 is a partially exploded longitudinal cross-sectional view of one of the bicycle control (brake/shift) devices illustrated in FIGS. 1-6, prior to coupling bicycle control (brake/shift) device to the end portion of the handlebar.

As seen in FIGS. 6 and 7, the base member 24 basically has a main body member 30, a cap member 31 coupled to the main body member 30 by a pair of fasteners or screws 32, a fixing bolt 33, a plurality of expansion members 34 coupled together by an elastic ring member 35 and a fixing nut 36. The base member 24 is configured to house the electrical shift control switch 26 and pivotally support the brake lever 28. The main body member 30 has a stationary projection 38 that is sized to be received inside the free end of the handlebar 14. The base member 24 has a handlebar mounting portion that is formed by the fixing bolt 33, the expansion members 34, the elastic ring member 35, the fixing nut 36 and the stationary projection 38. Thus, these parts 33-38 of the handlebar mounting portion are configured and arranged to fixedly mount to the main body member 30 to the free end of the handlebar 14 as seen in FIG. 8.

Figure 5:
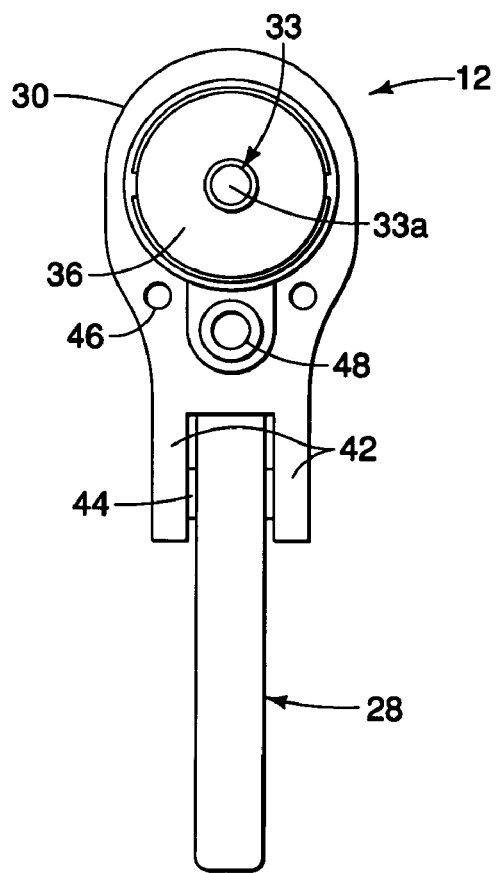
FIG. 5 is a rear end elevational view of one of the bicycle control (brake/shift) devices illustrated in FIGS. 1-4 in accordance with the present invention.

The main body member 30 has a hollow interior 40 for housing the electrical shift control switch 26 and a pair of flanges 42 for pivotally supporting the brake lever 28 via a pivot pin 44. The cord 19 and the cable 22 extend into the main body member 30 through openings 46 and 48, respectively, as best seen in FIG. 5. Thus, the hollow interior 40 of the main body member 30 constitutes an electrical switch housing portion of the base member 24, while the flanges 42 constitute a brake lever mounting portion of the base member 24. The brake lever 28 is pivotally attached to the flanges 42 of the base member 24 to be selectively moved relative to the base member 24 between a rest position and a braking position. Preferably, the electrical switch housing portion and the brake lever mounting portion of the main body member 30 is integrally formed together as a one-piece, unitary member from a lightweight, rigid material such as cast aluminum. When the base member 24 is mounted to the free end of the handlebar 14, the electrical shift control switch 26 extends longitudinally from the handlebar mounting portion such that main center longitudinal axis $A_1$ of the free end of the handlebar 14 extends longitudinally through the electrical shift control switch 26. When the screws 32 are unthreaded from holes in the main body member 30 and the cap member 31 is detached from the main body member 30, the electrical shift control switch 26 can be removed from the main body member 30 without detaching the main body member 30 from the handlebar 14.

Figure 8:
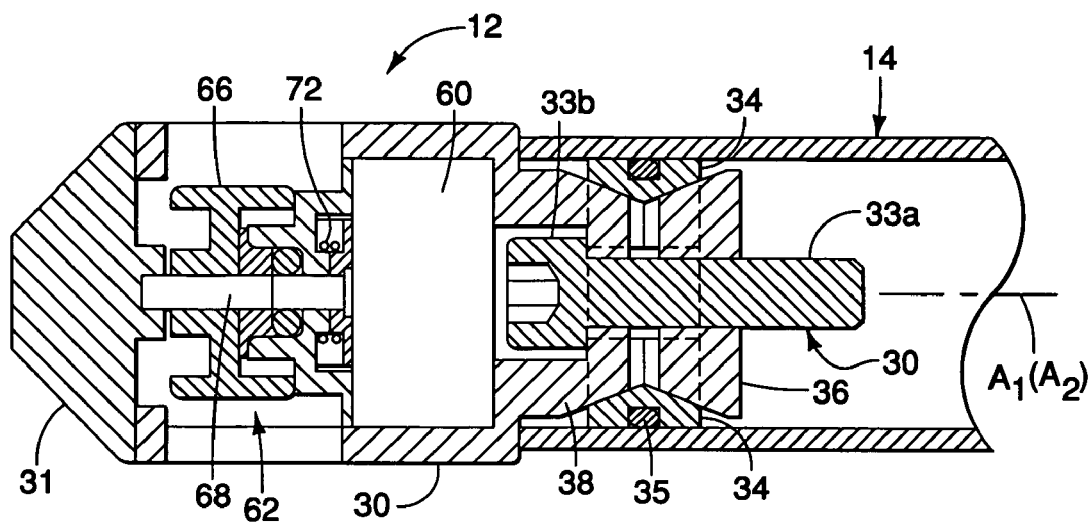
FIG. 8 is a longitudinal cross-sectional view of one of the bicycle control (brake/shift) devices illustrated in FIGS. 1-7, after being coupled to the free end of the handlebar.

Referring to FIGS. 6-8, the handlebar mounting portion is basically an expandable unit that is slidable within the free end of the handlebar 14 in a first (unexpanded) configuration and non-slidable within the free end of the handlebar 14 in a second (expanded) configuration, as best seen in FIG. 8. Thus, the expansion members 34 and the elastic ring member 35 form an expansion structure of the expandable unit that is configured and arranged to be slidable within the free end of the handlebar 14 to fix the base member 24 is mounted to the free end of the handlebar 14.

Specifically, the elastic ring member 35 is a resilient element that engages the outer peripheral surfaces of the expansion members 34, which are arranged in a circular pattern. The expansion members 34 cooperate with the outer conical surfaces of the fixing nut 36 and the stationary projection 38 such that the expansion members 34 move in a radial direction when the fixing nut 36 is moved axially by the fixing bolt 33 to selectively retain and release the base member 24 within the free end of the handlebar 14. More specifically, the fixing nut 36 acts as axially movable member that moves axially towards the stationary projection 38 in response to rotational movement of the fixing bolt 33 that is threaded into the fixing nut 36 to expand an outer diameter of outer peripheral surfaces of the expansion members 34 against the elastic force of the elastic ring member 35.

The parts of the handlebar mounting portion will now be discussed in more detail. The fixing bolt 33 is a fixing member that is preferably a conventional bolt having a threaded shaft 33a and an enlarged head 33b with a hexagonal bore. The fixing bolt 33 extends through a stepped bore 38a of the stationary projection 38. The fixing nut 36 is preferably a circular shaped member as viewed in an axial direction. The fixing nut 36 includes a threaded bore 36a and a wedge surface 36b. The threaded bore 36a threadedly receives the threaded shaft 33a such that rotation of the fixing member or bolt 33 axially moves the fixing nut 36. The wedge surface 36b is a frustoconical surface configured to cooperate with the expansion members 36.

The expansion members 34 are preferably curved, arc-shaped members that are circumferentially arranged about a longitudinal axis of the fixing bolt 33 to move radially outwardly upon axially moving the fixing nut 36. Preferably, the expandable unit includes three of the expansion members 34. Each of the expansion members 34 includes a pair of opposed, arc-shaped inclined surfaces 34a and 34b, and an outer groove 34c. The arc shaped inclined surfaces 34a of the expansion members 34 form a substantially frustoconically shaped wedge surface of the expansion structure, while arc shaped inclined surfaces 34b of the expansion members 34 form another substantially frustoconically shaped wedge surface of the expansion structure. The arc shaped inclined surfaces 34a contact the stationary projection 38, while the arc-shaped inclined surfaces 34b contact the wedge surface 36b of the fixing nut 36.

Specifically, the stationary projection 38 is preferable a circular shaped member as viewed axially with a wedge surface 38b. The wedge surface 38b is preferably a frustoconical surface substantially identical to the wedge surface 36b. The arc shaped inclined surfaces 34a of the expansion members 34 contact the wedge surface 38b of the stationary projection 38. Thus, when the fixing bolt 33 is rotated to move the fixing nut 36 toward the stationary projection 38 of the base member 24, the wedge surfaces 38b and 36b cooperate with the arc-shaped inclined surfaces 34a and 34b, respectively, to move the expansion members 34 and elastic ring member 35 (i.e., the expansion structure) radially outwardly. When the fixing bolt 33 is tightened The elastic ring member 35 is preferably a continuous annular O-ring that is constructed of a resilient material such as rubber. The elastic ring member 35 extends around the expansion members 34 to retain the expansion members 34 together with the fixing bolt 33 and the fixing nut 36. Specifically, the elastic ring member 35 is received in the grooves 34c of the expansion members 34 so the expansion members 34 do not become accidentally misplaced during assembly.

Figure 9:
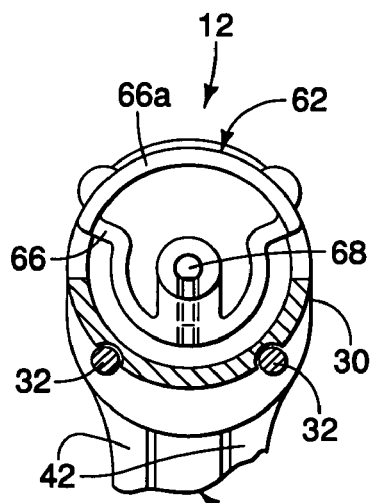
FIG. 9 is a simplified, partial transverse cross-sectional view of one of the bicycle control (brake/shift) devices illustrated in FIGS. 1-8, with the operating member in the neutral position.
Figure 10:
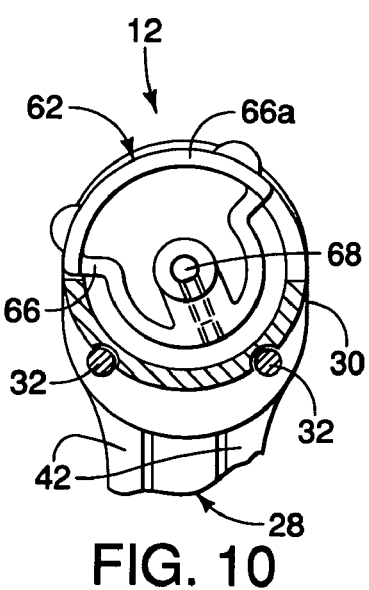
FIG. 10 is a simplified, partial transverse cross-sectional view of one of the bicycle control (brake/shift) devices illustrated in FIGS. 1-8, with the operating member in first actuating position.
Figure 11:
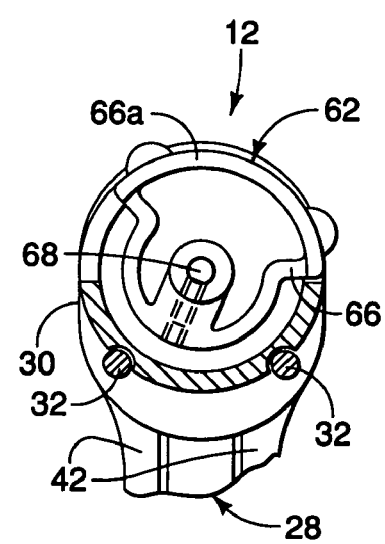
FIG. 11 is a simplified, partial transverse cross-sectional view of one of the bicycle control (brake/shift) devices illustrated in FIGS. 1-8, with the operating member in a second actuating position.

Referring to FIGS. 6-11, the electrical shift control switch 26 is mounted to the base member 24 as mentioned above. Basically, the electrical shift control switch 26 is electrically coupled to the electrical cord 19 having one or more electrical conductors. The electrical shift control switch 26 basically includes a housing 60, an operating member 62 and an electrical contact assembly 64. The precise structure of the electrical shift control switch 26 is not important to the understanding of the present invention and can be construction in a variety of ways to carry out the present invention. However, preferably, the operating member 62 is configured and arranged to pivot about an operating axis $A_2$ that is parallel to the center axis $A_1$ of the free end of the handlebar 14 when the base member 24 is mounted to the free end of the handlebar 14. Thus, the operating member 62 is preferably moved relative to the base member 24 between a neutral position and a pair of actuating positions as seen in FIG. 9-11. The operating member 62 is disposed on an opposite side of the base member 24 from the brake lever 28. The operating member 62 has a curved operating surface with a curvature substantially corresponding to a curvature of the free end of the handlebar 14.

More specifically, the operating member 62 basically has an actuator 66, a pivot shaft 68 and a toggle member 70. The operating member 62 is pivotally coupled to the housing 60 and operatively coupled to the electrical contact assembly 64 to be selectively moved relative to the base member 24 (i.e., to first and second actuating positions from a neutral, rest position). The electrical contact assembly 64 is mounted within the housing 60 and is configured and arranged to be operated by the operating member 62. Accordingly, the electrical shift control switch 26 (i.e., the operating member 62) can be utilized for both upshifting and downshifting one of the derailleurs. The first and second actuating positions (FIGS. 10 and 11) are arranged on opposite sides of the neutral position (FIG. 9). Of course, it will be apparent to those skilled in the art from this disclosure that the upshifting and downshifting positions of the operating member 62 could be reversed if needed and/or desired, depending on how the electrical cord 19 is connected.

The actuator 66 is fixedly attached the outer end of the pivot shaft 68 by a set pin that contacts a flat portion of the outer end of the pivot shaft 68. The inner end of the pivot shaft 68 has the toggle member 70 fixedly coupled thereto. Thus, rotation of the actuator 66 by the rider causes the pivot shaft 68 and the toggle member 70 to rotate therewith. A biasing element (coil spring) 72 is positioned between the housing 60 and the toggle member 70 to normally bias the toggle member 70, and thus, the operating member 62 to the normal rest or neutral position. In particular, one end of the spring 72 is preferably received in an axial hole (not shown) of the housing 60, while the other end of the spring 72 is preferably received in an axial hole (not shown) of the toggle member 70. The axial holes (not shown) and the spring 72 are preferably arranged and configured to bias the operating member 62 to the neutral rest position from the first and second actuating positions.

The actuator 66 basically includes a curved operating section 66a that is textured. In particular, the curved operating section 66a preferably includes a plurality of axially extending grooves to facilitate engagement with the rider's thumb, fingers or hand. Thus, the curved operating section 66a is a rider actuating section. Despite the texture, the operating section 66a has an overall curvature substantially corresponding to the curvature of the free end F of the handlebar 14 relative to the rotational axis $A_2$ and the center axis $A_1$.

As best seen in FIG. 7, the brake lever 28 is pivotally attached to the base member 24 by the pivot pin 44 to be selectively moved relative to the base member 24 between a rest position and a braking position. In particular, the brake lever 28 is pivotally attached to the flanges 42 of the base member 24. The brake lever 28 is disposed on an opposite side of the base member 24 from the operating member 62. The upper end of the brake lever 28 has a cable attachment structure 74 that is disposed between the flanges 42 and arranged such that the brake cable 22 extends generally parallel to the center axis $A_1$ of the free end of the handlebar 14 from the cable attachment structure 74.

General Interpretation of Terms

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Also in understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
a base member including a handlebar mounting portion configured to be fixedly mounted to a free end of a handlebar and an electrical switch housing portion extending longitudinally from the handlebar mounting portion such that a center axis of the free end of the handlebar extends longitudinally through the electrical switch housing portion when the base member is mounted to the free end of the handlebar;
an electrical shift control switch mounted to the electrical switch housing portion of the base member, the electrical shift control switch having an operating member that pivots relative to the handlebar mounting portion with the operating member being axially arranged relative to the handlebar mounting portion such that the operating member does not axially overlap the free end of the handlebar when the handlebar mounting portion is fixedly mounted to the free end of the handlebar as viewed in a direction perpendicular to the center axis of the free end of the handlebar; and
a brake lever pivotally attached to the base member to be selectively moved relative to the base member between a rest position and a braking position.

2. The bicycle control device according to claim 1, wherein the operating member is pivotally mounted to pivot about an operating axis that is parallel to the center axis of the free end of the handlebar when the base member is mounted to the free end of the handlebar.

3. The bicycle control device according to claim 2, wherein the operating member has a curved operating surface with a curvature substantially corresponding to a curvature of the free end of the handlebar.

4. The bicycle control device according to claim 3, wherein the brake lever is disposed on an opposite side of the base member from the operating member.

5. The bicycle control device according to claim 1, wherein the operating member is disposed on an opposite side of the base member from the brake lever.

6. The bicycle control device according to claim 1, wherein the handlebar mounting portion has an expandable unit that is configured and arranged to be slidable within the free end of the handlebar to fix the base member is mounted to the free end of the handlebar.

7. The bicycle control device according to claim 6, wherein the operating member is pivotally mounted to pivot about an operating axis that is parallel to the center axis of the free end of the handlebar when the base member is mounted to the free end of the handlebar.

8. The bicycle control device according to claim 7, wherein the operating member has a curved operating surface with a curvature substantially corresponding to a curvature of the free end of the handlebar.

9. The bicycle control device according to claim 8, wherein the brake lever is disposed on an opposite side of the base member from the operating member.

10. The bicycle control device according to claim 1, wherein
the brake lever is pivotally attached to the handlebar mounting portion of the base member by a pair of flanges.

11. The bicycle control device according to claim 10, wherein
the brake lever has a cable attachment structure that is disposed between the flanges and arranged such that a brake cable extends generally parallel to the center axis of the free end of the handlebar from the cable attachment structure.

* * * * *